2,921,830

HYDRON BLUE DYESTUFF COMPOSITIONS

John Taras, Alpha, and Robert E. Brouillard, Westfield, N.J., assignors to General Aniline & Film Corporation, New York, N.Y., a corporation of Delaware No Drawing. Application July 31, 1956
Serial No. 601,125

12 Claims. (Cl. 8—37)

This invention relates to emulsions of Hydron Blue dyestuffs, and particularly, to a method of preparing such dyestuffs of high concentration.

Sulfur dyestuffs of the carbazole indophenol type have been recognized in the art for their low cost compared to most other dyes, combined with good fastness properties in all respects except chlorine fastness. Hence a large commercial usage has grown up for those purposes in which contact with chlorine or other oxidizing agents is of minor or insignificant consideration.

The manufacture of such dyestuffs has heretofore been carried out by the thionation of the carbazole indophenol intermediate, a slow, time-consuming operation, which was followed by aeration, oxidation and filtration operations. Each of these steps, in addition to being time consuming, resulted in a marked degradation of the product as evidenced by large losses in yield and color value of the dye produced. In addition considerable expense was involved in the labor of handling the presscake and controlling the longer reaction cycle.

The application of these dyestuffs in the past has required a pre-reduction of the dyestuff in the bath with aqueous sodium sulfide before being applied to the fiber, a step which requires time and additional mixing equipment and results in considerable loss of color due to instability. Other disadvantages of the paste and powder forms include difficulty in standardization and dusting of the powder forms.

Concentrated aqueous liquid solutions of sulfur dyes are much preferred to paste or powder forms because they may be completely formulated by the manufacturer to include all necessary ingredients for the dye bath. In this way the dyer need only dilute to the desired strength with water and the solution formed is ready to be used. Accurate standardization may be obtained since the manufacturer has a more fundamental control of the production processes. Handling difficulties with pastes and powders are simplified and rendered much cleaner and dust free.

In the preparation of the aforesaid liquid sulfur dyes, several methods have been proposed. One method starts with the finished oxidized sulfur dyestuff and solubilizes it with the reaction of aliphatic straight chain amines. Another method involves the reaction of the sulfurized dyestuff with specific ratios of sodium sulfide and hydrosulfide of 1:1, 2:1, respectively. It is claimed that the solution of the dyestuff is less alkaline and of a lower pH than solutions in sodium sulfide or sodium sulfide with added alkali. Still another method involves the production of the dyestuff in the presence of a solubilizing agent such as, for example, sodium sulfonates of toluene, xylene, cymene, dimethyl aniline and tetrahydronaphthalene in the presence of an alkali ether of mono- or diethylene glycol. Other methods include the heating of the dyestuff with monoalkylol amines until reduced and solubilized; the employment of water miscible hydroxy aliphatic compounds of one to four carbon atoms, such as methanol, propanol, glycerine, ethylene glycol, ethylene glycol monoethyl ether and the like in the presence of sodium sulfide and caustic soda; and by heating an aqueous suspension of the dyestuff with sufficient amounts of sodium hydrosulfide and sodium polysulfide to form a true solution having an alkalinity above 1% calculated as caustic soda.

In some of these methods the resulting liquid solution must be filtered or centrifuged to clarify the liquid dye.

It is an object of the present invention to provide an emulsion of an indophenol sulfurized-vat dyestuff of the Hydron Blue type which is stable and ready for dyeing.

Another object is to provide a process of preparing such emulsion.

Other objects and advantages will become manifest from the following description:

We have found that an indophenol sulfurized-vat dyestuffs in a stable emulsion form can be made directly from the carbazole indophenol base material without resorting to filtration or isolation of any kind, producing a ready to dye emulsion high concentration, which can be applied directly to the fiber. The emulsion has the advantage over ordinary liquid sulfur dyes in that the active dyestuff composition is concentrated in one phase of the emulsion. It is stable to oxidation due to the decreased surface area involved. In fact it is more stable than true solutions. In the case of true solutions the surface area is at a maximum due to the state of molecular dispersion. This feature alone is of great importance in dealing with sulfur dyestuffs which are known to be readily oxidized with consequent loss of color value, even when the dyestuff is in the unreduced state as prepared in the past. Another significant advantage of the emulsion is that no difficulty is experienced with separation on cooling, or salting out, which is the common shortcoming of true solutions.

In accordance with the process of the present invention the carbazole indophenol sulfurized-vat dyestuff is prepared in situ without the use of sodium hydrosulfide. The pH values are relatively high and range from 10.0 to 12.5. Inasmuch as the dyestuff is prepared in situ the time consuming and costly step of isolating the press cake, following filtration or centrifuging, and treating it with aqueous sodium sulfide and sodium hydrosulfide is completely eliminated.

In practicing the present invention, the following base materials are refluxed at a temperature of 100–125° C. for 18–36 hours. All parts are by weight:

12–35 carbazole indophenol dry (or equivalent amount of presscake)
15–120 water
20–105 water miscible hydroxy or dihydroxy aliphatic compound or aliphatic alkoxy alcohol containing from 2 to 10 carbon atoms
0–40 caustic soda flakes
4–20 sodium sulfide
20–85 sulfur
3–15 ionic or non-ionic surface active agent The mixture, after refluxing, is cooled to 100° C. and approximately 2 parts i.e. from 1.7 to 2.1 parts of the mass diluted with 1 part of a 20–22% aqueous sodium sulfide solution. The resulting emulsion may be used as such or cooled to room temperature. The pH ranges from 10 to 12.5, and the alkalinity is greater than 1% calculated as caustic soda. The resulting aqueous emulsion dyes cotton directly deep blue.

The water miscible hydroxy or dihydroxy aliphatic compound or alkoxy or aliphatic alkoxy alcohol is an essential component of the base material mixture in that it aids emulsification in conjunction with the ionic or non-ionic surface active agent. As examples of such hydroxy, dihydroxy aliphatic compounds and aliphatic alkoxy alcohols, the following may be mentioned:

| | |
|---|---|
| Methyl alcohol | Ethylene glycol mono-methyl ether |
| Ethyl alcohol | |
| Propyl alcohol | Ethylene glycol mono-ethyl ether |
| Isopropyl alcohol | |
| Butyl alcohol | Ethylene glycol mono-propyl ether |
| Amyl alcohol | |
| 2- or 3-pentanol | Ethylene glycol mono-butyl ether |
| 1-hexanol | |
| 1-heptanol | Ethylene glycol mono-amyl ether |
| Butoxyethanol | |
| Amyloxy ethanol | Ethylene glycol mono-hexyl ether |
| Hexyloxy ethanol | |
| Ethylene glycol | Ethylene glycol mono-octyl ether and the corresponding monoalkyl ethers of diethylene glycol |
| Propylene glycol | |
| Trimethylene glycol | |
| Tetramethylene glycol | |
| Hexamethylene glycol | |
| Decamethylene glycol | Dipropylene glycol |

Surface active agents of this type include the following:

Ionic:
- Alkylaryl sulfonates of more than 7 carbon atoms
- Alkyl sulfates of fatty alcohols
- Sulfonated amides and amines of fatty acid groups and sulfonated esters and ethers
- Sodium salts of fatty acids Non-ionic:
- Fatty acid esters and ethers
- Fatty alcohol ethers
- Alkylaryl polyglycol ethers
- Ethoxylated fatty acid amides In view of the foregoing classification no difficulty will be experienced by those skilled in the art in making a proper selection of either one of both types, since all of the surface active agents now available on the open market and classified either as ionic or non-ionic are useful for the purpose of the present invention. A few typical examples, however, may be mentioned, and in this regard they include the sodium salts of mono- and dialkyl substituted alkali sulfonates of 9 or more carbon atoms, dodecylbenzene sulfonate; condensation products of fatty acid chlorides of isethionic acid, the sodium salts of mono acid polyalkylated benzene sulfonates, sodium lauryl sulfate, allyl sodium sulfate, poly(2-ethyl hexyl) phosphate, sulfonated mineral oils produced from petroleum distillates and having high molecular weight hydrocarbons with at least one sulfonic acid group and molecular weights of 400–530, etc., esters of oleic, stearic and palmitic acids with polyhydroxy alcohols; polyoxyethylene derivatives of polyhydroxy alcohols, polyoxyethylene ethers of polyhydroxy alcohols, and the like.

The following examples are illustrative of the process of preparing emulsions of the indophenol sulfurized-vat dyestuff. It is to be clearly understood that these examples are merely illustrative and are not to be construed as being limitative. All of the parts given are by weight.

*Example I*

In a suitable vessel equipped with a refluxing condenser, thermometer and agitator the following components were added in the order given: 55 parts of carbazole indophenol presscake (=13.6 parts dry indophenol), 35 parts of ethylene glycol mono ethyl ether, 13 parts of caustic soda flakes, 5 parts of sodium sulfide, 28 parts of sulfur and 4 parts of the condensation product of formaldehyde and sodium naphthalene sulfonate. The mixture was refluxed for 24 hours (temp. 109–111° C.) and then cooled to 100° C. This fusion mass can be used directly in the preparation of a ready-to-dye Hydron Blue aqueous emulsion.

The Hydron Blue ready-to-dye aqueous emulsion is prepared from the fusion mass as follows: For each 2 parts of fusion mass at 100° C. is diluted with 1 part of a 22% aqueous solution of sodium sulfide.

The resulting aqueous emulsion has a pH of 10.6. A 20% dyeing of the aqueous emulsion on cotton yields full shades without the addition of any other chemicals, except the salt normally used in exhausting dyebaths of sulfur colors.

The shade is distinctly greener and considerably brighter than products derived from standard method of operation.

The emulsion contains Hydron Blue dyestuff equivalent to 13.6 parts of carbazole indophenol, 20–25 parts of sodium sulfide and 35 parts of ethylene glycol mono ethyl ether. The emulsion is ready for use by the dyer, and need not be filtered, centrifuged or otherwise clarified.

*Example II*

In a two liter flask equipped with a refluxing condenser, thermometer and agitator, the following components were added in the order given: 27.2 parts of carbazole indophenol dry, 50 parts of water, 50 parts of "Cellosolve" ethylene glycol mono ethyl ether, 26 parts of caustic soda flakes, 10 parts of sodium sulfide flakes, 56 parts of sulfur, 7½ parts of sodium lignin sulfonates, purchased in the open market under the brand name of Marasperse.

The mixture was refluxed for 36 hours and the reaction mass cooled to 100° C.

The fusion mass was converted to the aqueous emulsion which could then be used as a ready-to-dye dyestuff in the same manner as in Example I.

The cotton dyeings were considerably greener and brighter than products produced by standard methods.

*Example III*

The following mixture was refluxed at 110° C. for 24 hours: 61.8 parts of carbazole indophenol presscake (=13.6 parts of dry carbazole indophenol), 35 parts of propylene glycol, 13 parts of caustic soda flakes, 5 parts of sodium sulfide flakes, 28 parts of sulfur, 4 parts of condensation product of formaldehyde and sodium naphthalene sulfonate.

The reaction mixture was cooled to 100° C. and made into an aqueous emulsion by diluting with an aqueous solution of sodium sulfide as in Example I.

The aqueous emulsion has a pH of 10.9 and dyes cotton considerably greener and considerably brighter than Hydron Blue produced according to normal processes known in the art.

*Example IV*

The following mixture was kept at reflux for 24 hours (temperature 105° C.): 13.6 parts of carbazole indophenol dry, 35 parts of water, 35 parts of "Cellosolve" ethylene glycol mono ethyl ether, 28 parts of sulfur, 12 parts of condensation product of formaldehyde and sodium naphthalene sulfonate.

The aqueous emulsion was prepared in a manner similar to that described in Example I. A 20% dyeing of this aqueous emulsion yields a shade which is distinctly redder and considerably brighter than that obtained in Example I.

*Example V*

Example I was repeated with the exception that 6 parts of ethoxylated nonylphenol containing 9 ethoxy groups per molecule were used in place of the 4 parts of the condensation product of formaldehyde and sodium naphthalene sulfonate.

The ready-to-dye aqueous emulsion thus produced dyed cotton full shade of blue considerably greener and brighter than the Hydron Blue produced by standard procedure involving thionation, followed by aeration, oxidation and filtration.

Example VI

Example III was repeated with the exception that 4 parts of condensation product of formaldehyde and sodium naphthalene sulfonate were replaced by 6 parts of dodecylbenzene sulfonate.

The ready-to-dye aqueous emulsion thus produced dyed cotton in strong blue shades equal in depth to those shades produced by standard commercial Hydron Blue dyestuffs.

Example VII

The following mixture was refluxed at 110° C. for 24 hours: 61.8 parts of carbazole indophenol presscake (=13.6 parts dry carbazole indophenol), 40 parts of ethylene glycol, 13 parts of caustic soda flakes, 5 parts of sodium sulfide flakes, 30 parts of sulfur, 5 parts of condensation product of formaldehyde and sodium naphthalene sulfonate.

The aqueous emulsion was prepared from the fusion melt in the same manner as that used in Example I.

Cotton dyeings were a bright, greenish blue when compared to commercial samples of Hydron Blue. This color development was achieved without the addition of any other chemicals to the ready-to-dye-emulsion.

Example VIII

Example VII was repeated with the exception that the 40 parts of ethylene glycol were replaced by 35 parts of butanediol.

The aqueous emulsion exhibited tinctorial properties similar to the dyestuff described in Example VII.

Example IX

The following mixture was refluxed at 118–120° C. for 18 hours: 27.2 parts of carbazole indophenol dry, 25 parts of water, 25 parts of "Cellosolve" ethylene glycol mono ethyl ether, 26 parts of caustic soda flakes, 10 parts of sodium sulfide flakes, and 42 parts of sulfur and 4 parts of the surface active agent of Example I. After cooling to 100° C. 2 parts of the melt were diluted with 1 part of a 22% aqueous solution of sodium sulfide.

The ready-to-dye aqueous emulsion dyes cotton in blue shades somewhat greener than the shades produced from Hydron Blue powder.

Example X

The following mixture was refluxed for 24 hours: 40 parts of carbazole indophenol presscake (=13.6 parts of carbazole indophenol dry), 35 parts of "Cellosolve" ethylene glycol monoethyl ether, 13 parts of caustic soda flakes, 5 parts of sodium sulfide flakes, 28 parts of sulfur, 4 parts of condensation product of formaldehyde and sodium naphthalene sulfonate and 1 part of copper sulfate. The fusion melt (110 parts) was diluted at 100° C. with a solution of 14.2 parts of sodium sulfide flakes and 51.0 parts of water.

The ready-to-dye aqueous emulsion dyed cotton a blue shade but not as bright as that obtained in Example I. However, in simulated Williams Unit dyeings (190° F.) the emulsion dyed much stronger and redder than the product described in Example I.

Example XI

Example X was repeated with the exception that 1 part of copper sulfate was replaced by 4 parts of ferrous chloride ($FeCl_2 4H_2O$).

The ready-to-dye aqueous emulsion dyes cotton very much greener and duller shade of blue than the dyeings obtained in Example I.

Example XII

Example I was repeated with the exception that 13 parts of caustic soda flakes were replaced by 15 parts of soda ash.

The ready-to-dye aqueous emulsion dyed cotton in 20% strengths in shade and strength equal to that obtained in Example I.

The emulsions prepared in accordance with the present invention will contain, inter alia, from 8 to 15 parts of the dyestuff and from 9 to 15 parts of sodium sulfide per 100 parts of ready-to-dye emulsion.

We claim:

1. A ready to dye sulfur dyestuff in stable aqueous emulsion form comprising 8 to 15 parts by weight of a carbazole indophenol sulfur dye in reduced form, 30–55 parts by weight of an aliphatic hydroxy compound containing from 1 to 10 carbon atoms and selected from the group consisting of aliphatic mono- and di-alkanols, alkoxy alkanols, ethylene glycol monoalkyl ethers and diethylene glycol monoalkyl ethers, 3–15 parts by weight of a surface active agent selected from the class consisting of ionic and non-ionic surface active agents, and from 9 to 15 parts by weight of sodium sulfide.

2. A ready to dye sulfur dyestuff according to claim 1 wherein the aliphatic hydroxy compound is ethylene glycol monoethyl ether.

3. A ready to dye sulfur dyestuff according to claim 1 wherein the aliphatic hydroxy compound is ethylene glycol.

4. A ready to dye sulfur dyestuff according to claim 1 wherein the aliphatic hydroxy compound is dipropylene glycol.

5. A ready to dye sulfur dyestuff according to claim 1 wherein the aliphatic hydroxy compound is butoxyethanol.

6. A ready to dye sulfur dyestuff according to claim 1 wherein the aliphatic hydroxy compound is butanol.

7. A process of preparing a ready to dye fluid sulfur dyestuff in stable emulsion form which comprises heating at reflux 12–35 parts by weight of carbazole indophenol in the presence of 15–120 parts by weight of water, 20–105 parts by weight of an aliphatic hydroxy compound containing from 1 to 10 carbon atoms and selected from the group consisting of aliphatic mono- and di-alkanols, alkoxy alkanols, ethylene glycol monoalkyl ethers and diethylene glycol monoalkyl ethers, 0–40 parts by weight of caustic soda, 4–20 parts by weight of sodium sulfide, 20–85 parts by weight of sulfur and from 3–15 parts by weight of a surface active agent selected from the class consisting of ionic and non-ionic surface active agents, cooling the heated mass to 100° C. and diluting approximately two parts by weight thereof with 1 part by weight of a 20–22% aqueous sodium sulfide solution.

8. The process according to claim 7 wherein the aliphatic hydroxy compound is ethylene glycol monoethyl ether.

9. The process according to claim 7 wherein the aliphatic hydroxy compound is ethylene glycol.

10. The process according to claim 7 wherein the aliphatic hydroxy compound is dipropylene glycol.

11. The process according to claim 7 wherein the aliphatic hydroxy compound is butoxyethanol.

12. The process according to claim 7 wherein the aliphatic hydroxy compound is butanol.

References Cited in the file of this patent

UNITED STATES PATENTS 2,657,112    Robinson et al. _____ Oct. 27, 1953

OTHER REFERENCES

Chem. Ind., for 1943, pp. 326–328. Art. by Goldsmith.
Remington's Prac. of Pharmacy, 9th ed., Cook and Martin, pp. 592–595.